(12) United States Patent
Seo

(10) Patent No.: US 7,286,858 B2
(45) Date of Patent: Oct. 23, 2007

(54) PORTABLE TERMINAL DEVICE AND METHOD OF CONTROLLING THE SAME

(75) Inventor: Jae-hong Seo, Kunpo (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 670 days.

(21) Appl. No.: 10/251,828

(22) Filed: Sep. 23, 2002

(65) Prior Publication Data

US 2003/0144043 A1  Jul. 31, 2003

(30) Foreign Application Priority Data

Jan. 25, 2002   (KR) ................................ 2002-4501

(51) Int. Cl.
*H04B 1/38* (2006.01)
(52) U.S. Cl. ..................... 455/574; 455/343.2
(58) Field of Classification Search ................ 455/522, 455/574, 343, 421, 343.2, 343.3, 343.6, 127, 455/127.1, 127.2, 226.1, 226.4
See application file for complete search history.

(56) References Cited

U.S. PATENT DOCUMENTS 5,603,095 A * 2/1997 Uola ........................ 455/554.2

6,278,864 B1   8/2001  Cummins et al.
6,721,580 B1 * 4/2004  Moon ........................ 455/574
2002/0098859 A1 * 7/2002  Murata ....................... 455/522

FOREIGN PATENT DOCUMENTS

| JP | 2000-31893 | 1/2000 |
| JP | 2000-322180 | 11/2000 |
| JP | 2001-51756 | 2/2001 |
| KR | 1998-19352 | 6/1998 |

* cited by examiner

*Primary Examiner*—Matthew Anderson
*Assistant Examiner*—Angelica M. Perez
(74) *Attorney, Agent, or Firm*—Staas & Halsey LLP

(57) ABSTRACT

A portable terminal device and method thereof includes a main power supply to supply electric power to a system part of the portable terminal device, a wireless transmitting/receiving part to wirelessly transmit/receive RF signals through a network, the portable terminal device includes an indicator, an auxiliary power supply, and a micro controller determining whether a wireless connection to the network is possible by analyzing the RF signals, and controlling the indicator to indicate an analyzed result of the RF signals. A power controller controls the auxiliary power supply to supply electric power to the indicator, the micro controller, and the wireless transmitting/receiving part when the electric power is not supplied from the main power supply and the wireless connection to the network is possible.

6 Claims, 4 Drawing Sheets

PORTABLE TERMINAL DEVICE AND METHOD OF CONTROLLING THE SAME

CROSS-REFERENCE TO RELATED APPLICATIONS

This application claims the benefit of Korean Application No. 2002-4501, filed Jan. 25, 2002, in the Korean Patent Office, the disclosure of which is incorporated herein by reference.

BACKGROUND OF THE INVENTION

1. Field of the Invention

The present invention relates in general to a portable terminal device and a method of controlling the same, and more particularly, to a portable terminal device and a method of controlling the same, which can indicate whether a wireless connection to a network is possible, independently of whether the portable terminal device is turned on.

2. Description of the Related Art

As mobile telecommunications and wireless Internet are widely used, various services are wirelessly provided to a portable device through a network. Further, contrary to a desktop computer, which must be connected to a LAN cable through a LAN card in order to connect the portable device to the network, various terminals improving mobility and portability have been developed so as to connect the portable device to the network without being connected to the LAN cable whenever or wherever a user wants.

As a portable terminal device to connect to the network, there are a PDA (personal digital assistants), a web-pad, a portable computer, and so on. These portable terminal devices are handy to carry because a wireless LAN card is employed to connect to the network.

FIG. 4 illustrates a control block diagram of a conventional portable terminal device, focusing on a wireless communication part. As shown therein, the portable terminal device includes a system part 101 performing various operations, and controls a wireless transmitting/receiving part 107 transmitting/receiving an RF (radio frequency) signal, a signal processing part 105 processing the RF signal received from the wireless transmitting/receiving part 107, a data interface 103 transmitting a signal processed by the signal processing part 105 to the system part 101, and a main power supply 109 supplying electric power to the portable terminal device.

The wireless transmitting/receiving part 107 wirelessly receives the RF signal given through the network with an antenna (ATN), and wirelessly transmits data signal outputted from the system part 101 to the network with the antenna. Therefore, the wireless transmitting/receiving part 107 includes an amplifier, a modulator, a demodulator, etc., in order to process the RF signal. The signal processing part 105 converts the RF signal received from the wireless transmitting/receiving part 107 and the data signal outputted from the system part 101 through the data interface 103 into a base-band signal for transmitting and receiving.

With the configuration described above, the RF signal inputted through the wireless transmitting/receiving part 107 is transmitted to the system part 101 through the signal processing part 105 and the data interface 103, and the data signal outputted from the system part 101 is transmitted to the network through the data interface 103, the signal processing part 105, and the wireless transmitting/receiving part 107 so that the user transmits and receives data through the network.

In the conventional portable terminal device, if the user turns off the portable terminal device, the electric power is not supplied from the main power supply 109, thereby halting the portable terminal device. Therefore, the wireless transmission/reception of signals is also stopped.

However, wireless-connecting to the network may be impossible in a jamming area, such as subways, the inside of a building, etc., and the user cannot know whether a wireless connection to the network is possible without turning on the portable terminal device including the wireless transmitting/receiving function. Thus, the user has to check whether the wireless connection to the network is possible by turning on the portable terminal device in order to use the wireless transmission/reception of signals at a certain place.

SUMMARY OF THE INVENTION

Various objects and advantages of the invention will be set forth in part in the description that follows and, in part, will be obvious from the description, or may be learned by practice of the invention.

Accordingly, the present invention has been made keeping in mind the above-described shortcomings and user's need, and an object of the present invention is to provide a portable terminal device and a method of controlling the same, which can indicate whether wireless-connecting to a network is possible, independently of whether the portable terminal device is turned on.

To accomplish the above and other objects of the present invention, a portable terminal device includes a main power supply to supply electric power to a system part of the portable terminal device, a wireless transmitting/receiving part to wirelessly transmit/receive RF signals through a network, the portable terminal device including: an indicator; an auxiliary power supply; a micro controller determining whether a wireless connection to the network is possible by analyzing the RF signals, and controlling the indicator to indicate an analyzed result of the RF signals; and a power controller controlling the auxiliary power supply to supply electric power to the indicator, the micro controller, and the wireless transmitting/receiving part and determining and indicating whether a wireless connection to the network is possible, according to the RF signals received by the wireless transmitting/receiving part, when the electric power is not supplied from the main power supply.

The micro controller transmits a system turn-on signal to the power controller when the wireless connection to the network is possible, and the power controller turns on the system part when the system turn-on signal is inputted thereto.

The auxiliary power supply includes a rechargeable battery, and a charging part, where the power controller controls the charging part to charge the rechargeable battery with the electric power supplied from the main power supply when the portable terminal device is turned on.

According to another aspect of the present invention, the above and other objects may be also achieved by a method of controlling a portable terminal device including a wireless transmitting/receiving part to wirelessly transmit/receive RF signals through a network, including: determining and indicating whether a wireless connection to the network is possible by analyzing the RF signals received when the portable terminal device is turned off; receiving the RF signals from an outside source; and turning on the portable terminal device when the wireless connection to the network is possible as a result of the analyzing of the RF signals.

To accomplish the above and other objects of the present invention, a portable terminal device, includes: a wireless transmitting/receiving part to wirelessly transmit/receive RF signals through a network indicating whether a wireless connection to the network is possible, independently of whether the portable terminal device is turned on.

To accomplish the above and other objects of the present invention, is provided a method of a portable terminal device including a main power supply to supply electric power to a system part of the portable terminal device, a wireless transmitting/receiving part to wirelessly transmit/receive RF signals through a network, the method includes: controlling the auxiliary power supply to supply the electric power to the micro controller and the wireless transmitting/receiving part when the electric power is not supplied from the main power supply; receiving various RF signals through the wireless transmitting/receiving part; and analyzing the various RF signals to determine whether the wireless connection to the network is possible and outputting a signal indicative thereof.

To accomplish the above and other objects of the present invention, is provided a method of a portable terminal device including a main power supply to supply electric power to a system part of the portable terminal device, a wireless transmitting/receiving part to wirelessly transmit/receive RF signals through a network, the method includes: controlling the auxiliary power supply to supply the electric power to the micro controller and the wireless transmitting/receiving part when the electric power is not supplied from the main power supply; receiving various RF signals through the wireless transmitting/receiving part; analyzing the various RF signals to determine whether the wireless connection to the network is possible; and transmitting a system turn-on signal to the power controller, so that the power controller controls the main power supply to supply the electric power to the system part and to automatically turn on the portable terminal device when the wireless connection to the network is possible.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
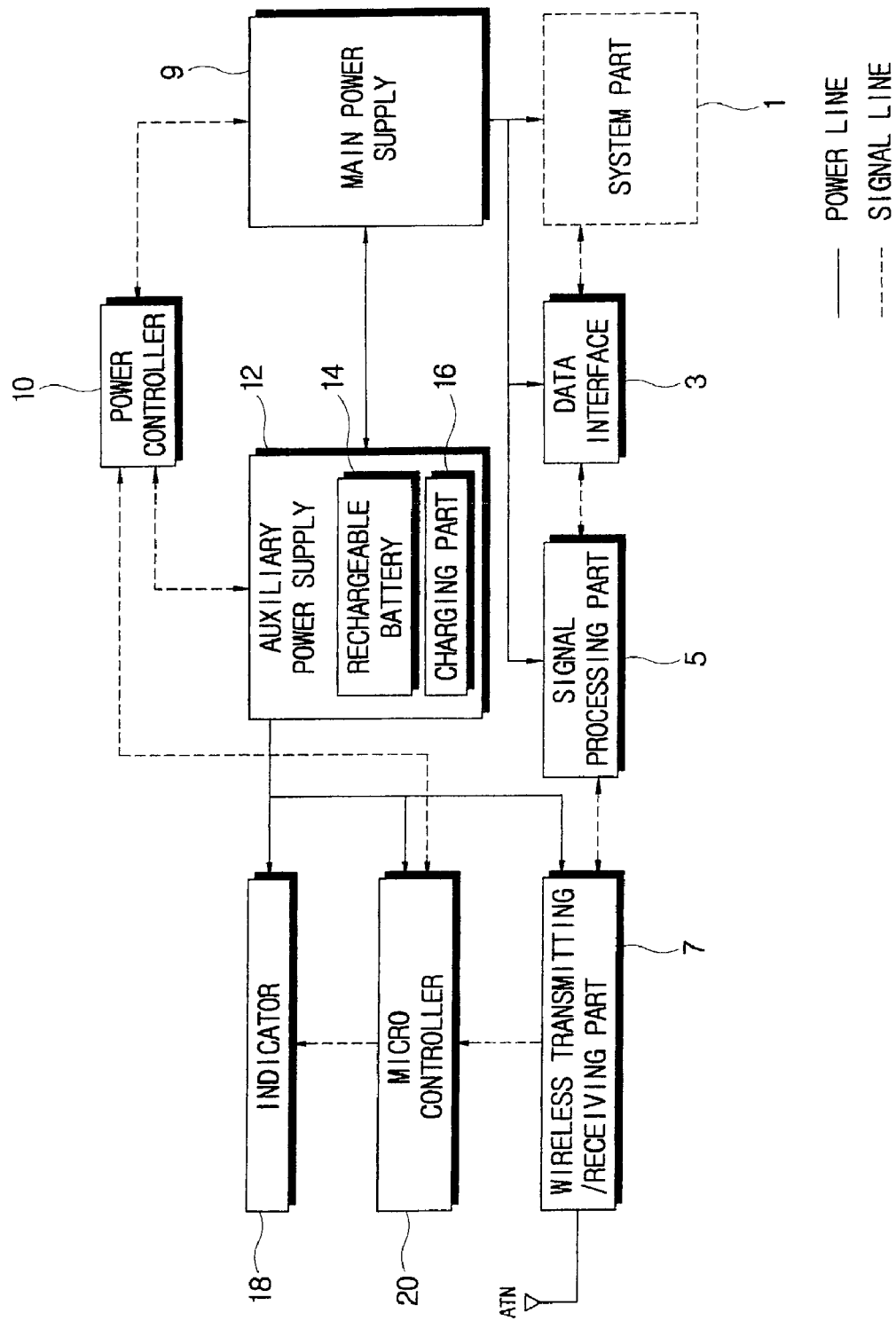
FIG. 1 is a control block diagram of a portable terminal device according to the present invention.

FIG. 1 is a control block diagram of a portable terminal device according to the present invention. As shown therein, the portable terminal device includes a system part 1 performing various operations and controls, a main power supply 9 supplying electric power to the system part 1, a wireless transmitting/receiving part 7 transmitting/receiving an RF (radio frequency) signal, a signal processing part 5 processing the RF signal received from the wireless transmitting/receiving part 7, and a data interface 3 transmitting the RF signal processed by the signal processing part 5 to the system part 1.

The wireless transmitting/receiving part 7 wirelessly receives the RF signal given through the network with an antenna (ATN), and wirelessly transmits a data signal outputted from the system part 1 to the network with the antenna. Therefore, the wireless transmitting/receiving part 7 includes an amplifier, a modulator, a demodulator, etc., in order to process the RF signal.

The signal processing part 5 converts the RF signal received from the wireless transmitting/receiving part 7 and the data signal outputted from the system part 1 through the data interface 3 into a base-band signal for transmitting and receiving.

Further, the portable terminal device further includes a micro controller 20 to analyze the RF signal or the data signal received by the wireless transmitting/receiving part 7, an indicator 18 to indicate an analyzed result from the micro controller 20, and an auxiliary power supply 12. A power controller 10 controls the auxiliary power supply 12 to supply electric power to the indicator 18, the micro controller 20, and the wireless transmitting/receiving part 7 when the electric power is not supplied from the main power supply 9.

Herein, when the portable terminal device is turned off, the power controller 10 determines that the electric power is not supplied from the main power supply 9, and controls the auxiliary power supply 12 to supply electric power to the indicator 18, the micro controller 20, and the wireless transmitting/receiving part 7. Therefore, even if the portable terminal device is turned off, the electric power is supplied to the indicator 18, the micro controller 20, and the wireless transmitting/receiving part 7 allowing operation.

When the electric power is supplied to the wireless transmitting/receiving part 7, various RF (radio frequency) signals are inputted to the wireless transmitting/receiving part 7 through the antenna (ATN). Then, the micro controller 20 determines whether the wireless connection to the network is possible by analyzing whether the RF signals inputted through the wireless transmitting/receiving part 7 belong to a service band of the network, and outputs an analyzed result signal to the indicator 18 to indicate an analyzed result.

Herein, the indicator 18 may include an LED (light-emitting diode), an LCD (liquid crystal display) panel, or etc. For example, in a case that the wireless connection to the network is determined to be possible from the analyzed result, the LED flickers, or the LCD panel displays a message thereon.

On the other hand, when the electric power is not supplied from the main power supply 9, that is, when the portable terminal device is turned off, the auxiliary power supply 12 supplies the electric power to components, such as the indicator 18, the micro controller 20, and the wireless transmitting/receiving part 7 to determine and to indicate whether the wireless connection to the network is possible. The auxiliary power supply 12 includes a rechargeable battery 14, and a charging part 16 to charge the rechargeable battery 14 with the electric power. Herein, the charging part 16 charges the rechargeable battery 14 with the electric power supplied from the main power supply 9 while the portable terminal device is turned on.

Figure 2:
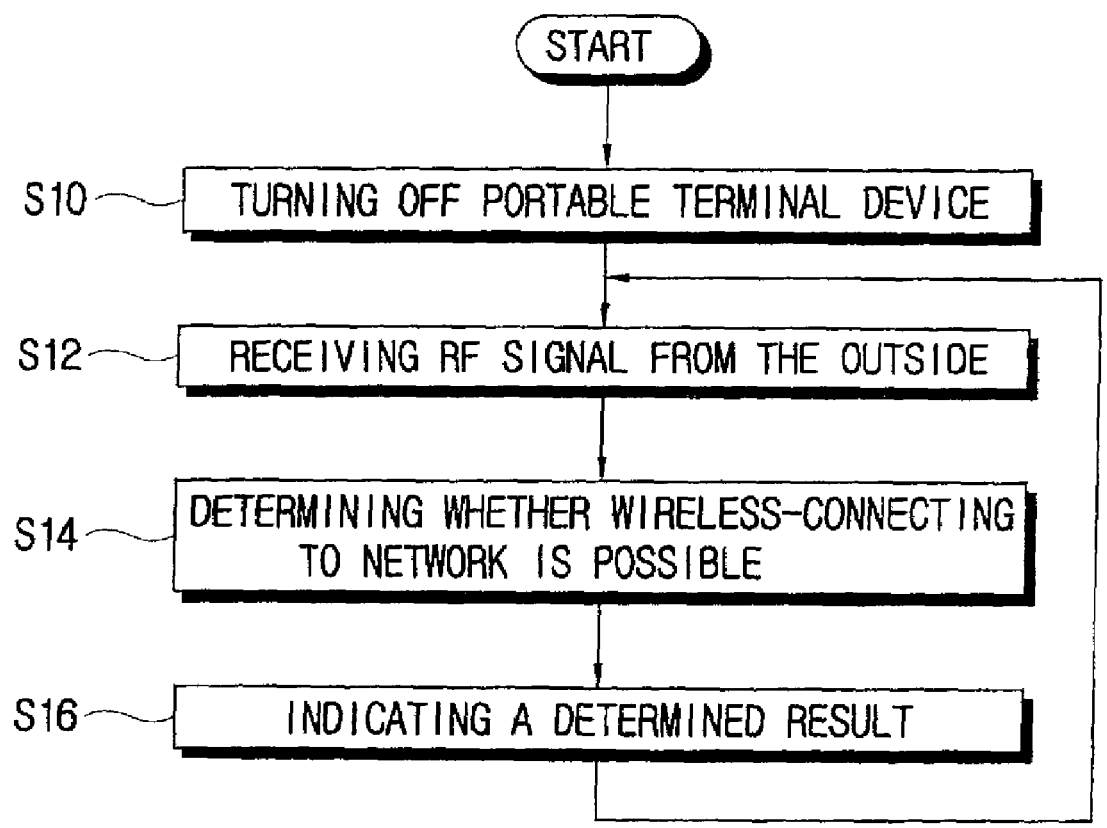
FIG. 2 is a control flow chart of the portable terminal device according to a first embodiment of the present invention.

FIG. 2 is a control flow chart of the portable terminal device according to a first embodiment of the present invention. As shown therein, at S10, if the user turns off the portable terminal device, the power controller 10 controls the auxiliary power supply 12 to supply the electric power to the components, such as the indicator 18, the micro controller 20, and the wireless transmitting/receiving part 7 to determine and to indicate whether the wireless connection to the network is possible.

At S12, the wireless transmitting/receiving part 7 driven by the electric power supplied from the auxiliary power supply 12 receives the various RF signals from an outside source through the antenna (ATN). At S14, the micro controller 20 determines whether the wireless connection to the network is possible by analyzing the RF signals inputted through the wireless transmitting/receiving part 7, and, at S16, controls the indicator 18 to indicate the analyzed result.

As described above, even if the portable terminal device is turned off, the electric power is independently supplied to the components to determine and to indicate whether the wireless connection to the network is possible, thereby alerting the user to know whether the wireless connection to the network is possible without turning on the portable terminal device.

Figure 3:
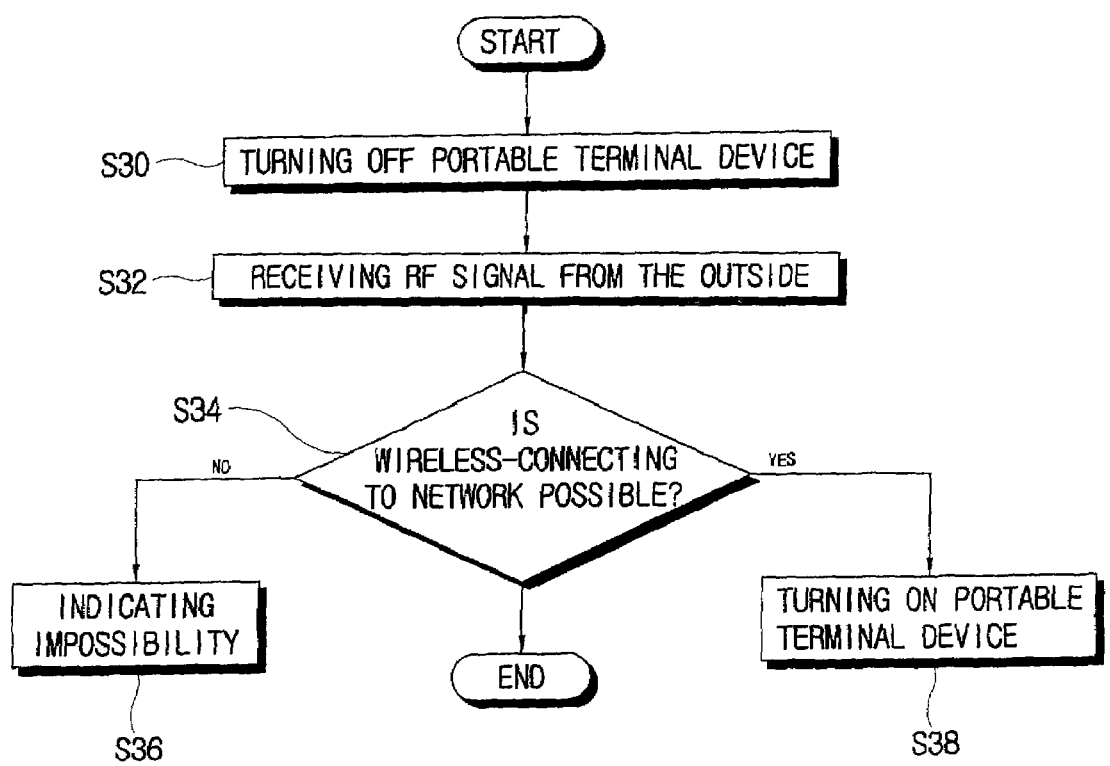
FIG. 3 is a control flow chart of the portable terminal device according to a second embodiment of the present invention.
Figure 4:
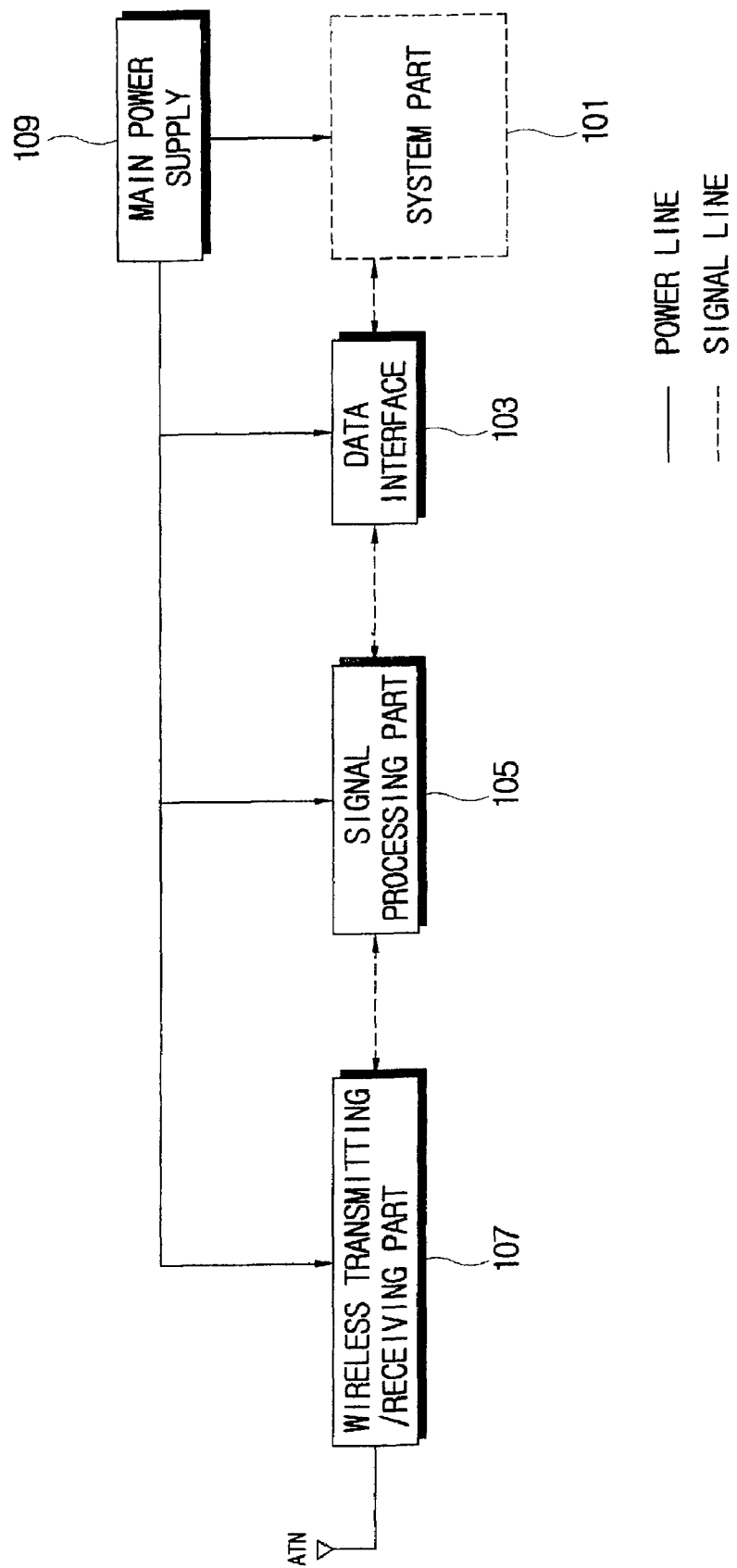
FIG. 4 is a control block diagram of a conventional portable terminal device.

On the other hand, FIG. 3 is a control flow chart of the portable terminal device according to a second embodiment of the present invention. As shown therein, at S30, if the user turns off the portable terminal device, the power controller 10 controls the auxiliary power supply 12 to supply the electric power to the components, such as the indicator 18, the micro controller 20, and the wireless transmitting/receiving part 7 to determine and to indicate whether the wireless connection to the network is possible.

At S32, the wireless transmitting/receiving part 7 driven by the electric power supplied from the auxiliary power supply 12 receives the various RF signals from the outside source through the antenna (ATN). At S34, the micro controller 20 determines whether the wireless connection to the network is possible by analyzing the RF signals inputted through the wireless transmitting/receiving part 7.

When the wireless connection to the network is not possible, at S36, the micro controller 20 controls the indicator 18 to indicate that the wireless connection to the network is not possible. Oppositely, at S38, when the wireless connection to the network is possible, the micro controller 20 transmits a system turn-on signal to the power controller 10, so that the power controller 10 controls the main power supply 9 to supply the electric power to the system part 1. In this case, although the portable terminal device is being turned off, if the wireless connection to the network is possible, the portable terminal device is automatically turned on.

As described above, even if the portable terminal device is turned off, the electric power is independently supplied to the components of the portable terminal device to determine and to indicate whether the wireless connection to the network is possible, thereby alerting the user to know whether the wireless connection to the network is possible without turning-on the portable terminal device.

As described above, the present invention provides a portable terminal device and a method of controlling the same, which can indicate whether a wireless connection to a network is possible, independently of whether the portable terminal device is turned on.

Although exemplary embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A portable terminal device comprising a main power supply to supply electric power to a system part of the portable terminal device, a wireless transmitting/receiving part to wirelessly transmit/receive RF signals through a network, the portable terminal device comprising:
    an indicator;
    an auxiliary power supply;
    a micro controller determining whether a wireless connection to the network is possible by analyzing the RF signals, and controlling the indicator to indicate an analyzed result of the RF signals; and
    a power controller controlling the auxiliary power supply to supply electric power only to the indicator, the micro controller, and the wireless transmitting/receiving part so as to determine and indicate whether a wireless connection to the network is possible, according to the RF signals received by the wireless transmitting/receiving part, when the electric power is not supplied from the main power supply.

2. The portable terminal device as recited in claim 1, wherein the micro controller transmits a system turn-on signal to the power controller when the wireless connection to the network is possible, and the power controller turns on the system part when the system turn-on signal is inputted thereto.

3. The portable terminal device as recited in claim 1, wherein the auxiliary power supply comprises a rechargeable battery, and a charging part, where the power controller controls the charging part to charge the rechargeable battery with the electric power supplied from the main power supply when the portable terminal device is turned on.

4. The portable terminal device as recited in claim 1, wherein the indicator comprises an LED (light-emitting diode) or an LCD (liquid crystal display) panel.

5. The portable terminal device as recited in claim 1, further comprising:
    a signal processing part to convert the RF signals from the wireless transmitting/receiving part and a data signal from the system part into a base-band signal.

6. A method of a portable terminal device comprising a main power supply to supply electric power to a system part of the portable terminal device, a wireless transmitting/receiving part to wirelessly transmit/receive RF signals through a network, the method comprising:
    controlling the auxiliary power supply to supply the electric power only to the micro controller and the wireless transmitting/receiving part when the electric power is not supplied from the main power supply;
    receiving various RF signals through the wireless transmitting/receiving part;
    analyzing the various RF signals to determine whether the wireless connection to the network is possible;
    indicating whether a wireless connection to the network is possible, the indicating being independent of whether the portable device is in a turned-on state; and
    transmitting a system turn-on signal to the power controller, so that the power controller controls the main power supply to supply the electric power to the system part and to automatically turn on the portable terminal device when the wireless connection to the network is possible.

* * * * *